United States Patent
Hiroshima et al.

(10) Patent No.: US 6,899,652 B2
(45) Date of Patent: May 31, 2005

(54) CONTINUOUSLY VARIABLE TRANSMISSION

(75) Inventors: Seiji Hiroshima, Okazaki (JP); Minoru Sawayama, Okazaki (JP); Takao Kimura, Aichi (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 59 days.

(21) Appl. No.: 09/737,279

(22) Filed: Dec. 14, 2000

(65) Prior Publication Data

US 2001/0016527 A1 Aug. 23, 2001

(30) Foreign Application Priority Data

Dec. 14, 1999 (JP) .......................................... 11-354827

(51) Int. Cl.[7] .............................................. F16H 9/12
(52) U.S. Cl. ...................................... 475/210; 477/46
(58) Field of Search ...................... 474/18, 28; 477/45, 477/46, 49

(56) References Cited

U.S. PATENT DOCUMENTS

| | | | | |
|---|---|---|---|---|
| 4,543,852 A | * | 10/1985 | Svab et al. ................. | 475/210 |
| 4,820,243 A | | 4/1989 | Fub ............................. | 474/43 |
| 4,838,834 A | * | 6/1989 | Miyata ........................ | 474/11 |
| 4,913,686 A | * | 4/1990 | Hattori ........................ | 474/18 |
| 5,006,092 A | * | 4/1991 | Neuman et al. ............. | 474/11 |
| 5,176,579 A | | 1/1993 | Ohsono et al. ............... | 474/1 |
| 5,295,920 A | | 3/1994 | Sawasaki et al. ........... | 475/210 |
| 5,334,108 A | * | 8/1994 | Lamers ........................ | 474/28 |
| 5,361,744 A | * | 11/1994 | Teraoka ...................... | 123/561 |
| 5,439,419 A | * | 8/1995 | Yamada et al. .............. | 474/18 |
| 5,800,299 A | * | 9/1998 | Lamers et al. ............... | 474/45 |
| 5,997,430 A | * | 12/1999 | Tanabe ........................ | 477/46 |
| 6,015,359 A | * | 1/2000 | Kunii .......................... | 474/18 |
| 6,280,357 B1 | * | 8/2001 | Van Spijk ................... | 474/16 |
| 6,461,269 B1 | * | 10/2002 | Tonohata et al. ........... | 475/210 |

FOREIGN PATENT DOCUMENTS

| | | | |
|---|---|---|---|
| DE | 3200439 A1 | * | 7/1983 |
| JP | 6148657 A | * | 3/1986 |
| JP | 63-201255 U A | | 12/1988 |
| JP | 2-236044 A | | 9/1990 |
| JP | 5288261 A | * | 11/1993 |
| JP | 10-205594 A | | 8/1998 |

* cited by examiner

Primary Examiner—Matthew C. Graham
(74) Attorney, Agent, or Firm—Rossi, Kimms & McDowell (57) ABSTRACT

A belt-type continuously variable transmission is provided with a housing end wall that is formed with a bearing mounting hole, through which one end portion of a primary shaft penetrates, a rolling bearing that rotatably supports, in a state that it is fitted in the bearing mounting hole, the one end portion of the primary shaft having a primary pulley, a flange that projects from the inside circumferential surface of the bearing mounting hole on the housing inward side, a bearing retainer that is provided on the outside surface of the end wall and cooperates with the flange to pinch the bearing, and a cover that is connected to the housing and covers the one end portion of the primary shaft and the bearing retainer.

14 Claims, 4 Drawing Sheets

CONTINUOUSLY VARIABLE TRANSMISSION

BACKGROUND OF THE INVENTION

1. Field of the Invention

The present invention relates to a belt-type continuously variable transmission.

2. Description of the Related Art

In belt-type continuously variable transmissions, an endless belt is wound on an input-side primary pulley and an output-side secondary pulley that are provided in a housing and the rotation radius of the endless belt is varied by the two pulleys. The transmission gear ratio can be varied continuously.

In such belt-type continuously variable transmissions, the endless belt receives a heavy load and hence the endless belt needs to be sufficiently durable.

Needless to say, the durability of the endless belt strongly depends on the structure and the material of the belt itself. In addition, the durability is greatly influenced by the positions of the primary pulley and the secondary pulley, specifically, the relationship between the positions of a primary shaft and a secondary shaft of the respective pulleys in the axial direction. That is, if the primary shaft and the secondary shaft are not positioned correctly relative to each other in the axial direction, the endless belt is twisted and its durability is much lowered.

In the positioning of the primary shaft and the secondary shaft, first, one shaft is attached rotatably to the housing via a rolling bearing and its position in the axial direction is determined. Then, the other shaft is attached to the housing via a rolling bearing and its position in the axial direction is adjusted with respect to the one shaft by using a shim, a snap ring, or the like, whereby the primary shaft and the secondary shaft are aligned properly with each other in the axial direction.

Figure 3:
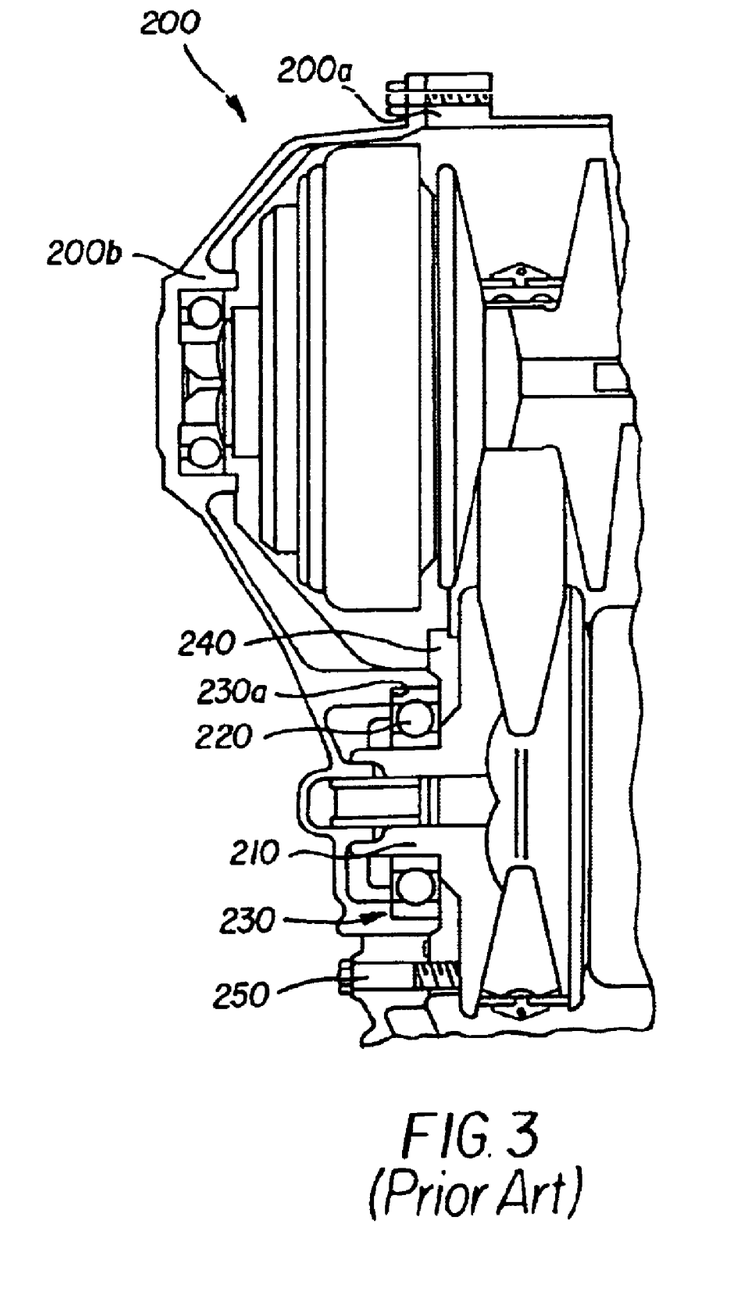

Incidentally, the following method is conceivable to attach the primary shaft and the secondary shaft to the housing. For example, as shown in FIG. 3, a housing 200 is configured in such a manner as to be divided into a housing body 200a and a housing cover 200b and a bearing 220 for supporting a reference shaft 210 rotatably is fitted into the inside circumferential surface of a bearing mounting hole 230 of the housing cover 200b through which the shaft 210 is to penetrate. Then, the bearing 220 is held by pinching its outer ring from both sides in the axial direction by an end surface 230a of the housing cover 200b that is formed at one end (left end in FIG. 3) in the axial direction of the inside circumferential surface and a plate-like bearing retainer 240 that is fixed to an end surface of the housing cover 200b at the other end (right end in FIG. 3) in the axial direction.

However, to fix the bearing retainer 240 to the housing cover 200b, a plurality of screw holes should be formed in the bearing retainer 240 and joining bolts 250 are threadedly engaged with those screw holes through the housing cover 200b. In screwing the joining bolts 250, the bearing retainer 240 hides in the housing cover 200b and hence it is difficult to align the screw holes of the bearing retainer 240 with the corresponding insertion holes of the housing cover 200b. That is, the screwing of the joining bolts 250, that is, the fixing of the bearing retainer 240, cannot be performed easily.

Further, the bearing retainer 240 needs to be thick enough to allow formation of screw holes therein. The thick bearing retainer 240 causes the rolling bearing 220 to be bound strongly to the housing cover 200b, which is a factor of causing a phenomenon that the bearing 220 is deformed by thrust load from the pulley and the life of the transmission itself is shortened. To prevent such deformation of the bearing 220, it is necessary to make thinner the bearing retainer 240 that is in contact with the outer ring of the bearing 220 and thereby reduce its rigidity and hold the bearing 220 elastically with the bearing retainer 240. However, having a special sectional shape, such a bearing retainer 240 needs complex working and hence increases the cost.

SUMMARY OF THE INVENTION

The present invention has been made in view of the above circumstances in the art, and an object of the invention is therefore to provide a belt-type continuously variable transmission that is simple in configuration and easy to assemble and in which the primary pulley and the secondary pulley can be positioned correctly in the axial direction.

To attain the above object, the invention provides a belt-type continuously variable transmission comprising a continuously variable transmission mechanism comprising a primary shaft having a primary pulley; a secondary shaft having a secondary pulley; and an endless belt wound on the primary pulley and the secondary pulley; a housing that accommodates the continuously variable transmission mechanism, the housing having an end wall that is formed with a first bearing mounting hole through which one end portion of one of the primary shaft and the secondary shaft penetrates; a first bearing that is fitted in the first bearing mounting hole and allows the one shaft to be supported rotatably by the end wall; a flange that projects from an inside circumferential surface of the first bearing mounting hole on the housing inward side; a bearing retainer that is provided on an outside surface of the end wall so as to project inward in a radial direction of the first bearing mounting hole and that cooperates with the flange to pinch the bearing; and a first cover that is connected to the housing and covers the one end portion of the one shaft and the bearing retainer.

In this belt-type continuously variable transmission, the one end portion of the one shaft is inserted in the first bearing mounting hole that is formed in the end wall of the housing and, in this state, the first bearing is attached to the one end portion and fitted into the first bearing mounting hole. Then, the bearing retainer is attached to the outside surface of the end wall and the bearing is pinched by the bearing retainer and the flange that projects from the inside circumferential surface of the first bearing mounting hole on the housing inward side, whereby the one shaft is positioned in the axial direction. Then, the first cover is attached to the housing so as to cover the one end portion of the one shaft and the bearing retainer. The assembling is thus completed.

It is preferable that the end wall be formed with a second bearing mounting hole through which one end portion of the other of the primary shaft and the secondary shaft penetrates, and that the belt-type continuously variable transmission further comprise a second bearing that is fitted in the second bearing mounting hole and allows the other shaft to be supported rotatably by the end wall; an urging member that is in contact with a side surface of the second bearing on the housing inward side, the urging member being elastically deformable in an axial direction of the primary shaft and the secondary shaft; and a second cover that is connected to the housing, covers the one end portion of the other shaft, and cooperates with the urging member to pinch the second bearing in the axial direction.

In this continuously variable transmission, the one end portion of the other shaft having a corresponding pulley is inserted into the second bearing mounting hole and, in this state, the second bearing is attached to the one end portion and fitted into the second bearing mounting hole at the same time. Then, the second cover is attached to the housing, whereby the second bearing is pinched by the second cover and the urging member that is deformed elastically. In this manner, the other shaft is positioned in the axial direction, that is, its assembling is completed.

The first cover and the second cover may be integral with each other.

DESCRIPTION OF THE PREFERRED EMBODIMENT

Figure 1:
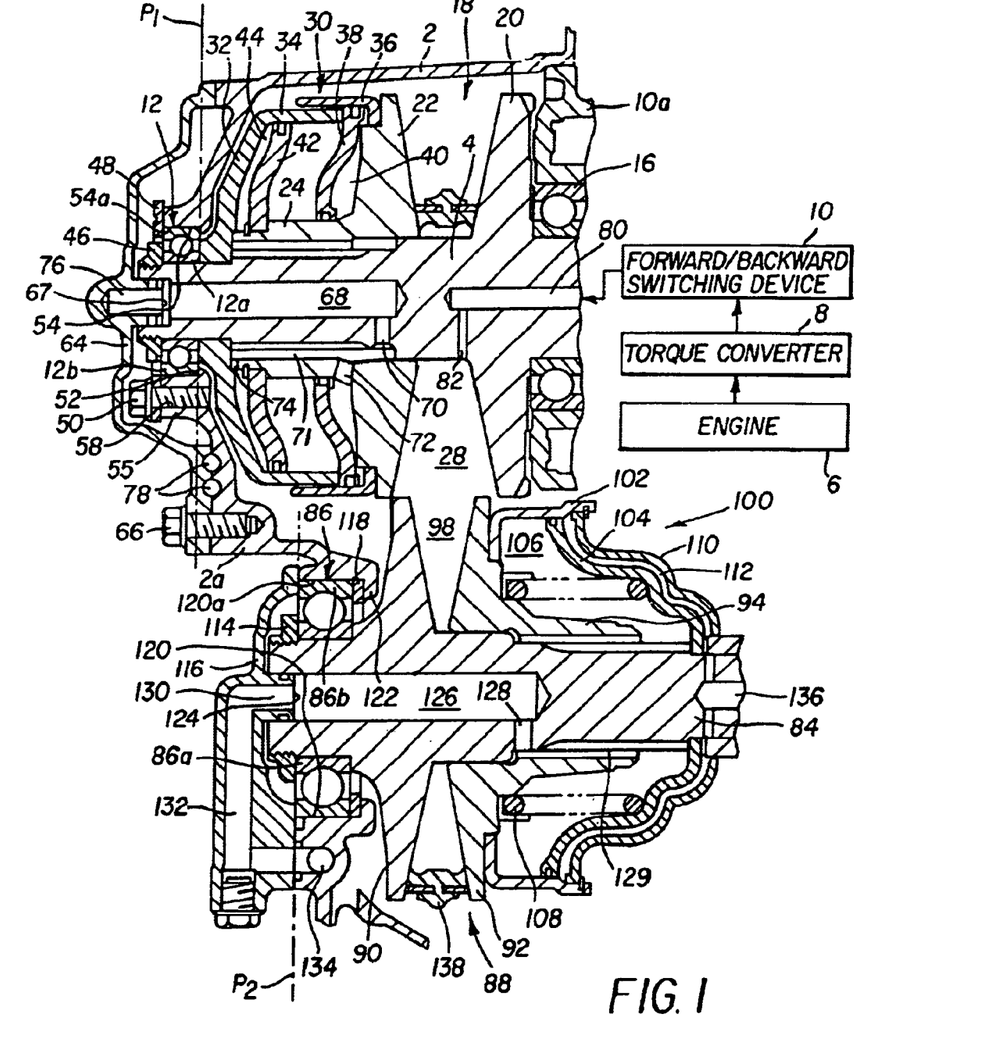
FIG. 1 is a sectional view of the main part of a vehicular belt-type continuously variable transmission (CVT) according to an embodiment of the invention.

FIG. 1 shows a belt-type continuously variable transmission that is part of a vehicular automatic transmission. The continuously variable transmission has a primary shaft 4 in a housing 2. The primary shaft 4 receives the torque of an engine 6 via a torque converter 8 and a forward/backward switching device 10 and can rotate in both normal and reverse directions.

One end portion (on the left side in FIG. 1) of the primary shaft 4 is supported, via a rolling bearing 12, by an end wall 2a of the housing 2 that is disposed on one end side (left side in FIG. 1) of the continuously variable transmission, and the other end portion (on the right side in FIG. 1) of the primary shaft 4 is supported by a casing 10a of the forward/backward switching device 10 via a rolling bearing 16.

The primary shaft 4 is equipped with a primary pulley 18, which is composed of a fixed sheave 20 and a movable sheave 22. The fixed sheave 20 disposed adjacent to the forward/backward switching device 10 and is integral with the primary shaft 4.

The movable sheave 22 has a boss 24 on the side opposite to the fixed sheave 20. The boss 24 is attached to the primary shaft 4 via a ball spline mechanism, whereby the movable sheave 22 is supported so as to be movable with respect to the primary shaft 4 in the axial direction. The fixed sheave 20 and the movable sheave 22 cooperate with each other to form a V-shaped groove 28.

The movable sheave 22 is integral with a double-piston oil-hydraulic actuator 30. The oil-hydraulic actuator 30 has a fixed wall 32 and a movable cylinder 36. The fixed wall 32 is fixed to the primary shaft 4 on the end wall 2a side and its outer circumferential portion serves as a fixed cylinder 34 that surrounds the boss 24. The movable cylinder 36 is provided on the outer circumferential portion of the movable sheave 22 and overlaps with the fixed cylinder 34 (the movable cylinder 36 is located outside the fixed cylinder 34).

An annular front piston 38, which is provided at the movable-sheave-22-side tip of the fixed cylinder 34, cooperates with the movable cylinder 36, the movable sheave 22, and the boss 24 to form a front oil chamber 40. An annular rear piston 42, which is provided at the fixed-wall-32-side tip of the boss 24, cooperates with the fixed cylinder 34 and the fixed wall 32 to form a rear oil chamber 44.

One end portion of the primary shaft 4 projects leftward in FIG. 1 from the end wall 2a. A nut 46 that is threadedly engaged with the projected end portion of the primary shaft 4 and an end of the fixed wall 32 pinch an inner ring 12a of the bearing 12.

A plate-like bearing retainer 48 is fixed to the outside surface (i.e., the end surface on the left side in FIG. 1) of the end wall 2a with a plurality of joining bolts 50, which are threadedly engaged with screw holes 58 that are formed in the end wall 2a. The bearing retainer 48 has such a ring shape as to surround the nut 46 in the radial direction. An inside peripheral portion of the bearing retainer 48 cooperates with a flange 52 of the end wall 2a to pinch an outer ring 12b of the bearing 12.

More specifically, the bearing 12 is fitted in an inside circumferential surface 54a of a bearing mounting hole 54 that is formed in the end wall 2a and through which the primary shaft 4 penetrates. The flange 52 projects from the inside circumferential surface 54a on the housing inward side, from an inwardly facing side of the end wall, toward the primary shaft 4 and thereby decreases the diameter of the bearing mounting hole 54 there. The flange 52 is integral with the end wall 2a. The flange 52 is engaged with the housing-inward-side (right side in FIG. 1) side surface, which is the inwardly facing side surface of the bearing 12, and cooperates with the bearing retainer 48 in the axial direction of the primary shaft 4 to pinch the outer ring 12b of the bearing 12.

Figure 2:
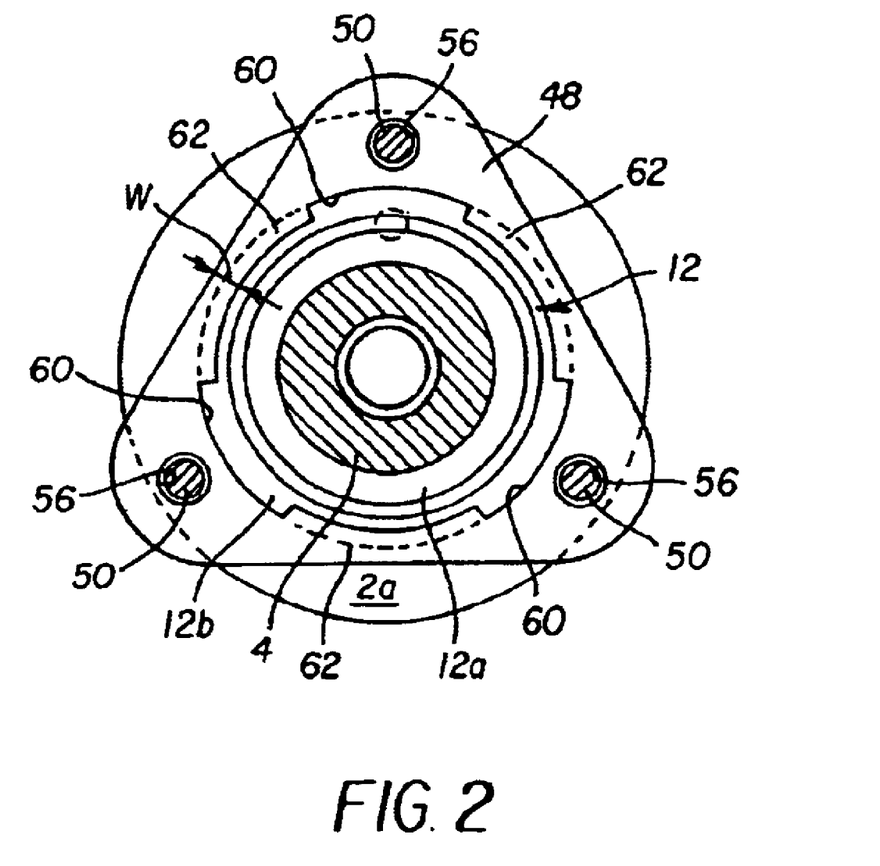

As shown in FIG. 2, the outer shape of the bearing retainer 48 generally assumes an equilateral triangle and is formed with bolt insertion holes 56 near the three respective apices. Three pressers 62 that project inward in the radial direction of the bearing mounting hole 54 and are in contact with the outer ring 12b of the bearing 12 are provided equidistantly in the circumferential direction at the inside periphery of the bearing retainer 48. Cuts 60 are formed in the bearing retainer 48 at positions corresponding to the respective bolt insertion holes 56 so as to extend in the circumferential direction. Since the bearing retainer 48 has a triangular shape, a width W (see FIG. 2) of each presser 62 in the radial direction of the bearing retainer 48 is small and hence the bearing retainer 48 is easily deformed elastically.

A cover 64 is hermetically attached to the housing-outward-side (left side in FIG. 1) surface of the end wall 2a with a plurality of joining bolts 66 and thereby forms a closed space around the projected end portion of the primary shaft 4 and the bearing retainer 48.

A projection 67, which projects from the inside surface of the cover 64 and is coaxial with the primary shaft 4, fits fluid-tight in a center hole 68 of the primary shaft 4. The center hole 68 communicates, via a radial hole 70 of the primary shaft 4, with an oil groove 71 that is formed on the same circumference as the ball spline mechanism. The oil groove 71 communicates with the front oil chamber 40 via a radial hole 72 of the boss 24 and also communicates with the rear oil chamber 44 via a groove 74 that is formed across the end surface of the boss 24.

On the other hand, the projection 67 is formed with a connection hole 76 that communicates with the center hole

68. The connection hole 76 is connected to an oil pressure control circuit (not shown). Therefore, the oil pressure control circuit is connected to both of the front oil chamber 40 and the rear oil chamber 44 via the above-mentioned passages 76, 68, 70, 72 and 74 and the oil groove 71 formed in the cover 64, the primary shaft 4, and the movable sheave 22. Including an oil-hydraulic pump and a solenoid-controlled supply/evacuation valve, the oil pressure control circuit controls supply and evacuation of operation oil to and from the front oil chamber 40 and the rear oil chamber 44 and thereby controls the pressures in the oil chambers 40 and 44 or the flow rates.

On the other hand, a secondary shaft 84 is disposed in the housing 2 parallel with the primary shaft 4. One end portion (on the left side in FIG. 1) of the secondary shaft 84 is supported by the end wall 2a via a rolling bearing 86, and the other end portion (on the right side in FIG. 1) is supported by the other end wall (on the right side in FIG. 1) of the housing 2 via a rolling bearing (not shown).

The secondary shaft 84 is equipped with a secondary pulley 88 that is paired with the primary pulley 18. Like the primary pulley 18, the secondary pulley 88 is composed of a fixed sheave 90 and a movable sheave 92. The fixed sheave 90 is integral with an end-wall-2a-side portion of the secondary shaft 84. The movable sheave 92 has a boss 94 on the side opposite to the fixed sheave 90. The boss 94 is attached to the secondary shaft 84 via a ball spline mechanism, whereby the movable sheave 92 is supported by the secondary shaft 84 so as to be movable in the axial direction. The fixed sheave 90 and the movable sheave 92 cooperate with each other to form a V-shaped groove 98 like the groove 28.

The movable sheave 92 is integral with a single-piston oil-hydraulic actuator 100. The oil-hydraulic actuator 100 is composed of a movable cylinder 102 that is provided behind (on the right side in FIG. 1) the movable sheave 92 so as to surround the boss 94 and an annular piston 104 that is fixed to the secondary shaft 84. The piston 104 cooperates with the movable cylinder 102 and the movable sheave 92 to form an oil chamber 106. In the oil chamber 106, a coiled spring 108 is disposed between the movable sheave 92 and the piston 104.

An annular balancing cap 110 is provided at the tip of the movable cylinder 102 so as to cover the piston 104. A centrifugal balance chamber 112 is formed between the piston 104 and the balancing cap 110.

As seen from FIG. 1, one end portion of the secondary shaft 84 also projects leftward in FIG. 1 from the end wall 2a. A nut 114 that is threadedly engaged with the projected end portion and a base portion of the fixed sheave 90 pinch an inner ring 86a of the bearing 86.

A cover 116 is hermetically attached, with a plurality of joining bolts (not shown), to the housing-outward-side (left-side in FIG. 1) end surface of the end wall 2a so as to cover the projected end portion of the secondary shaft 84. The cover 116 and an urging member such as a wave spring 118 that is provided on the end wall 2a pinch an outer ring 86b of the bearing 86.

More specifically, the bearing 86 is fitted in an inside circumferential surface 120a of a bearing mounting hole 120 that is formed in the end wall 2a and through which the secondary shaft 84 penetrates. A flange 122 projects from the inside circumferential surface 120a on the housing inward side toward the secondary shaft 84 and thereby decreases the diameter of the bearing mounting hole 120 there. The flange 122 is integral with the end wall 2a. The wave spring 118 is interposed between the flange 122 and the bearing 86. The housing-inward-side (in the axial direction) portion of the wave spring 118 is supported by the flange 122. When the bearing 86 is completely pressed inward along the inside circumferential surface 120a, the wave spring 118 that is adjacent to the bearing 86 in the axial direction of the secondary shaft 84 is deformed elastically in the axial direction of the secondary shaft 84 and thereby presses (urges) the bearing 86 against the cover 116.

A projection 124, which projects from the inside surface of the cover 116 and is coaxial with the secondary shaft 84, fits fluid-tight in a center hole 126 of the secondary shaft 84. The center hole 126 communicates with the oil chamber 106 via a radial hole 128 and an oil groove 129.

On the other hand, a connection hole 130 that communicates with the center hole 126 is formed in the projection 124. The connection hole 130 communicates with an internal passage 134 of the housing 2 via an internal passage 132 of the cover 116. The internal passage 134 is connected to the above-mentioned oil pressure control circuit. The oil pressure control circuit supplies operation oil for pinching of an endless belt 138 (described later) to the oil chamber 106 of the oil-hydraulic actuator 100 via the oil passages 130, 126, and 128 and the oil groove 129.

An operation oil supply passage 136, which is formed in the secondary shaft 84, guides operation oil to the above-mentioned centrifugal balance chamber 112.

The endless belt 138 is wound on the primary pulley 18 and the second pulley 88 and thereby transmits, to the secondary shaft 84, rotational power that is input to the primary shaft 4.

When the oil pressure in the front oil chamber 40 is increased, the oil presses the front piston 38 and the movable sheave 22 leftward and rightward in FIG. 1, respectively. Although the front piston 38 is urged to move leftward in FIG. 1, its leftward movement is prevented by the fixed cylinder 34, that is, the fixed wall 32. As a result, only the movable sheave 22 moves rightward in FIG. 1. The oil pressure in the rear oil chamber 44 is increased at the same time, and the oil presses the fixed wall 32 and the rear piston 42 leftward and rightward in FIG. 1, respectively. Since the fixed wall 32 is fixed to the primary shaft 4 and hence prevented from axial movement, only the rear piston 42 moves rightward in FIG. 1. The rear piston 42 also presses the movable sheave 22 rightward via the boss 24. At this time, the movable sheave 22 receives driving force that is stronger than the pinching force of the single-piston oil-hydraulic actuator 100 of the secondary pulley 88 and moves toward the fixed sheave 20, whereby the width of the pinching groove 28 of the primary pulley 18 is decreased and the endless belt 138 is moved outward in the primary pulley 18. On the other hand, the endless belt 138 is moved inward in the secondary pulley 88. As a whole, a gear change toward the overdrive side is attained.

In contrast, when the oil pressures in the front oil chamber 40 and the rear oil chamber 44 are decreased, the driving force that is applied to the movable sheave 22 becomes weaker than the pinching force of the secondary pulley 88, whereby the movable sheave 22 moves away from the fixed sheave 20 and the width of the pinching groove 28 is increased. Therefore, the endless belt 138 is moved inward in the primary pulley 18 and outward in the secondary pulley 88. As a whole, a gear change toward the low side is attained.

As shown in FIG. 1, oil passages 78 may be provided between the cover 64 and the end wall 2a separately from the above-mentioned internal passage and may be used as lubricant passages. A lubricant supply passage 80 is formed inside the primary shaft 4. The passage 80 communicates with a radial hole 82, which has an opening in the outside circumferential surface of the primary shaft 4 at a position adjacent to the base portion of the fixed sheave 20.

Although not shown in FIG. 1, the rotational power of the secondary shaft 84 is transmitted to a differential via a transfer driving gear, a transfer driven gear, an output shaft, etc.

A primary pulley assembly consisting of the primary pulley 18 and the oil-hydraulic actuator 30 and a secondary pulley assembly consisting of the secondary pulley 88 and the oil-hydraulic actuator 100 are assembled in the following manner so as to be provided in the housing 2.

Figure 1A:
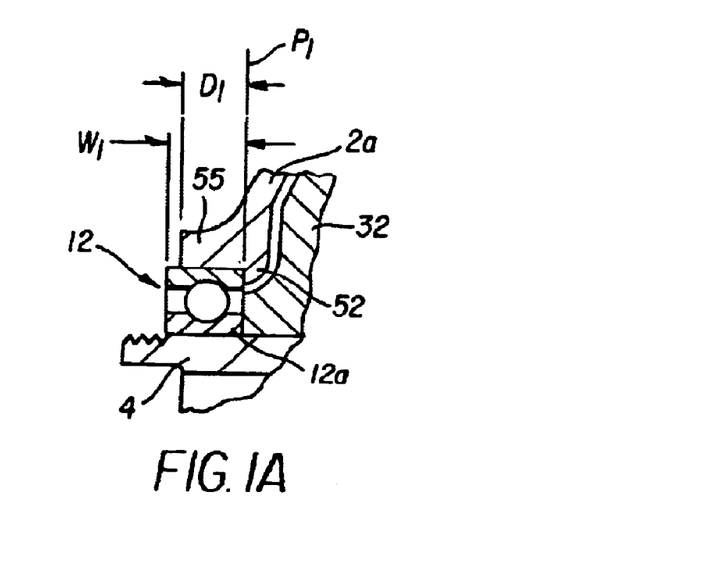
FIG. 1A is an enlarged view of a bearing located in the upper part of the CVT of FIG. 1, but with the axial load to the bearing removed to illustrate the relative width $W_1$ of the bearing being greater than the depth $D_1$ of the bearing mounting hole.
Figure 1B:
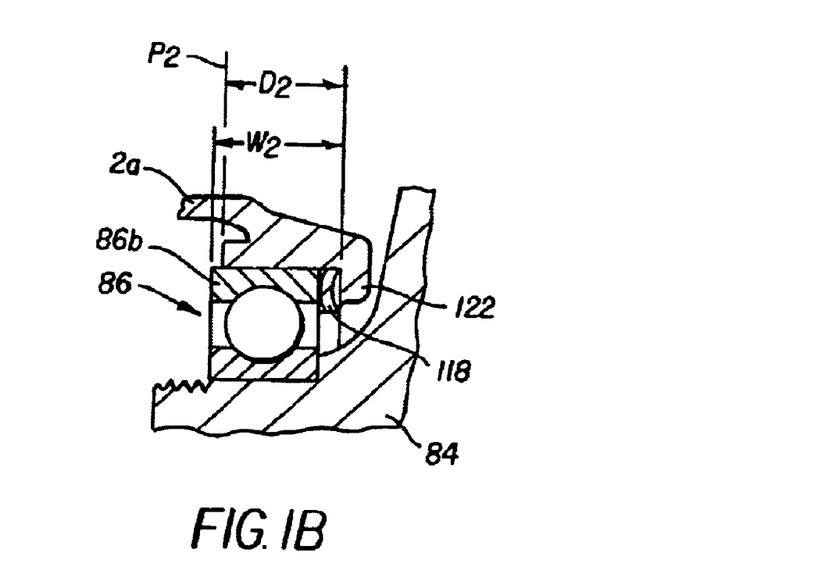
FIG. 1B is an enlarged view of a bearing located in the lower part of the CVT of FIG. 1, but with the axial load removed to illustrate the wave spring in a free state.

Referring to FIGS. 1, 1A and 1B, prior to description of an assembling procedure, the following points are noted. The end wail 2a of the housing 2 has a first contact surface where the flange 52 is in contact with the bearing 12 and a second contact surface where the end wall 2a is contact with the cover 116 on the secondary shaft 84 side. The first contact surface and the second contact surface are reference surfaces P1 and P2, respectively. The distance between the reference surfaces P1 and P2 is determined accurately. Working is performed to form the bearing mounting holes 54 and 120 with the first contact surface and second contact surface used as references, respectively. Specifically, the bearing mounting hole 54 on the primary shift 4 side is formed in such a manner that its depth $D_1$ (i.e., the distance between the outside surface of a beating support portion 55 of the end wall 2a and the reference surface P1) is slightly shorter than the width $W_1$ of the bearing 12. The bearing mounting hole 120 on the secondary shaft 84 side is formed in such a manner that its depth $D_2$ (i.e., the distance between the reference surface P2 and the flange 122) is shorter than the width $W_2$ of the bearing 86 plus the thickness of the wave spring 118 in a free state.

The attachment of the primary pulley assembly and the secondary pulley assembly is performed in the following manner. First, the primary pulley assembly is placed in the housing 2 and one end portion of the primary shaft 4 is inserted into the bearing mounting hole 54 and projected from the housing 2. In this state, while the bearing 12 is fitted into the inside circumferential surface 54a of the end wall 2a, the bearing 12 is press-fit along the one end portion of the primary shaft 4 until its inner ring 12a comes into contact with the left end of the fixed wall 32 of the oil-hydraulic actuator 30 and its outer ring 12b comes into contact with the flange 52. As a result, the position of the primary pulley 18 with respect to the reference surface $P_1$ is determined. At this time, since as described above the depth of the bearing mounting hole 54 is slightly shorter than the width of the bearing 12, the bearing 12 projects slightly from the outside surface of the end wall 2a to the outside of the housing 2 (leftward in FIG. 1).

In this state, the bearing retainer 48 is attached to the outside surface of the bearing support portion 55 of the end wall 2a with the joining bolts 50. At this time, whereas the pressers 62 (see FIG. 2) of the bearing retainer 48 are deformed elastically, the bearing retainer 48 cooperates with the flange 52 to pinch the outer ring 12b of the bearing 12 and presses (urges) the bearing 12 against the flange 52.

Then, the nut 46 is threadedly engaged with the projected end portion of the primary shaft 4, whereby the inner ring 12a of the bearing 12 is pinched by the nut 46 and the fixed wall 32 of the oil-hydraulic actuator 30. Then, the cover 64 is attached to the end wall 2a with the joining bolts 66 from the outside of the housing 2. The attachment of the primary pulley assembly is thus completed.

As described above, the bearing retainer 48 is jointed to the end wall 2a before attachment of the cover 64. Therefore, the alignment between the bolt insertion holes 56 of the bearing retainer 48 and the screw holes 58 of the end wall 2a can be performed easily and hence the bearing retainer 48 can be attached easily.

Since the bearing retainer 48 is formed with merely the bolt insertion holes 56 rather than screw holes, the bearing retainer 48 can be produced easily by, for example, punching such a thin and flat plate member that the pressers 62 apply a desired pressing (urging) force to the bearing 12.

On the other hand, the second pulley assembly is attached in the following manner. First, after the wave spring 118 is attached to the flange 122 of the end wall 2a, the secondary pulley assembly is placed in the housing 2 and one end portion of the secondary shaft 84 is projected through the bearing mounting hole 120. In this state, while the bearing 86 is fitted into the inside circumferential surface 120a of the bearing mounting hole 120, the bearing 86 is press-fit along the one end portion of the secondary shaft 84, whereby its inner ring 86a is brought into contact with the base portion of the fixed sheave 90 of the secondary pulley 88 and the bearing 86 is fixed at the regular position of the secondary shaft 84.

Then, the nut 114 is threadedly engaged with the projected end portion of the secondary shaft 84, whereby the inner ring 86a of the bearing 86 is pinched by the nut 114 and the base portion of the fixed sheave 90.

In this state, the cover 116 is attached to the end wall 2a so that the inside surface of the cover 116 comes into contact with the second contact surface of the end wall 2a and the housing-outward-side (left side in FIG. 1) side surface of the bearing 86. The attachment of the secondary pulley assembly is thus completed. At this time, while compressing and deforming the wave spring 118 elastically, the cover 116 presses the bearing 86 along the inside circumferential surface 120a until the housing-outward-side (left-side in FIG. 1) side surface of the outer ring 86b of the bearing 86 comes flush with the second contact surface (i.e., the reference surface $P_2$). The bearing 86 is pressed (urged) by the wave spring 118 toward the cover 116. In this manner, the position of the secondary shaft 84 in the axial direction, that is, the distance between the reference surface $P_2$ and the fixed sheave 90, is determined uniquely. Since the distance between the reference surfaces $P_1$ and $P_2$ set correctly in advance, the position of the secondary pulley 88 in the axial direction is automatically determined with the primary pulley 18 used as a reference.

The invention is not limited to the above embodiment and various modifications are possible. For example, although in the embodiment the covers 64 and 116 are separate members, they may be integrated with each other. The wave spring 118 may be replaced by another urging member. Further, the bearing supporting structure around the one end portion of the primary shaft 4 and that around the one end portion of the secondary shaft 84 may be interchanged.

As described above, in the belt-type continuously variable transmission according to the invention, by using a bearing retainer that can easily be produced by working and then attached, one pulley can be positioned in the axial direction and can be attached easily. Further, the other pulley can automatically be positioned in the axial direction with the one, reference-side pulley used as a reference and can be attached easily.

What is claimed is:

1. A continuously variable transmission comprising:
   a continuously variable transmission mechanism comprising:
     a primary shaft having a primary pulley;
     a secondary shaft having a secondary pulley; and
     an endless belt wound on the primary pulley and the secondary pulley;
   a housing that accommodates the continuously variable transmission mechanism, the housing having an end wall formed with a bearing mounting hole through which one end portion of one of the primary shaft and the secondary shaft penetrates, the end wall having an outwardly facing side, and an inwardly facing side opposite to the outwardly facing side around the bearing mounting hole, the inwardly facing side being located closer to the primary or secondary pulley associated with the one end portion of the one shaft than the first outwardly facing side;
   a bearing fitted in the bearing mounting hole and allowing the one shaft to be supported rotatably by the end wall;
   a flange extending radially from the inwardly facing side toward the bearing mounting hole;
   a bearing retainer fixed to the outwardly facing side of the end wall and projecting radially inwardly toward the bearing mounting hole, and engaging the bearing to pinch the bearing against the flange; and
   a cover connected to the housing and covering the one end portion of the one shaft and the bearing retainer.

2. The continuously variable transmission according to claim 1, wherein the depth of the bearing mounting hole, which extends in the axial direction, is shorter than the thickness of the bearing, which extends in the axial direction, and wherein the bearing receives urging force in a direction from the bearing retainer to the flange and is thereby in contact with the flange.

3. The belt-type continuously variable transmission according to claim 1, wherein the bearing retainer is deformed elastically when the bearing retainer is attached to the outwardly facing side of the end wall, and wherein the bearing retainer cooperates with the flange to pinch the bearing and presses the bearing against the flange.

4. A continuously variable transmission comprising:
   a continuously variable transmission mechanism comprising:
     a primary shaft having a primary pulley;
     a secondary shall having a secondary pulley; and
     an endless belt wound on the primary pulley and the secondary pulley;
   a housing that accommodates the continuously variable transmission mechanism, the housing having an end wall formed with a first bearing mounting hole through which one end portion of one of the primary shall and the secondary shaft penetrates, and that is formed with a second bearing mounting hole through which one end portion of the other of the primary shaft and the secondary shaft penetrates, the end wall having a first outwardly facing side and a first inwardly facing side opposite to the first outwardly facing side around the first bearing mounting hole, the first inwardly facing side being located closer to the primary or secondary pulley associated with the one end portion of the one shaft than the first outwardly facing side;
   a first bearing fitted in the first bearing mounting hole and allowing the one shaft to be supported rotatably by the end wall;
   a first flange extending radially from the first inwardly facing side toward the first bearing mounting hole;
   a bearing retainer provided on the first outwardly facing side of the end wall and projecting radially inwardly toward the first bearing mounting hole, and engaging the first bearing to pinch the first bearing against the first flange; and
   a first cover connected to the housing and covering the one end portion of the one shaft and the bearing retainer,
   a second bearing that is fitted in the second bearing mounting hole and allows the other shaft to be supported rotatably by the end wall, wherein the end wall has a second outwardly facing side and a second inwardly facing side opposite to second outwardly facing side around the second bearing mounting hole;
   a second flange extending radially from the second inwardly facing side toward the first bearing mounting hole;
   an urging member provided on an inwardly facing side surface of the second bearing, and supported by the second flange, the urging member being elastically deformable in an axial direction of the primary shaft and the secondary shaft, and being disposed between the second flange and the second bearing; and
   a second cover that is connected to the housing and covers the one end portion of the other shaft, and cooperates with the urging member to pinch the second bearing in the axial direction.

5. The continuously variable transmission according to claim 4, wherein the primary shaft is positioned in the axial direction by the first bearing contacting the first flange, and wherein the secondary shaft is positioned in the axial direction by the second bearing contacting the second cover.

6. The continuously variable transmission according to claim 5, wherein the depth of the first bearing mounting hole, which extends in the axial direction, is shorter than the thickness of the first bearing, which extends in the axial direction, and wherein the first bearing receives urging force in a direction from the bearing retainer to the first flange and is thereby in contact with the first flange.

7. The continuously variable transmission according to claim 5, wherein:
   the second cover contacts the second outwardly facing side of the end wall and an outer side surface of the second bearing in the same plane;
   the depth of the second bearing mounting hole, which extends in the axial direction, is shorter than the combined thickness of the second bearing and the urging member in a free state, which combined thickness extends in the axial direction; and
   the second bearing receives urging force in a direction from the urging member to the second cover and is thereby in contact with the second cover.

8. The continuously variable transmission according to claim 4, wherein the depth of the first bearing mounting hole, which extends the axial direction, is shorter than the thickness of the first bearing, which extends in the axial direction and wherein the first bearing receives urging force in a direction from the bearing retainer to the first flange and is thereby in contact with the first flange.

9. The continuously variable transmission according to claim 4, wherein:
   the second cover contacts the second outwardly facing side of the end wall and an outer side surface of the second bearing in the same plane;

the depth of the second bearing mounting hole, which extends in the axial direction, is shorter than the combined thickness of the second bearing and the urging member in a free state, which combined thickness extends in the axial direction; and the second bearing receives urging force in a direction from the urging member to the second cover and is thereby in contact with the second cover.

10. The continuously variable transmission according to claim 4, wherein each of the first and second covers has an oil passage through which operation oil is supplied to the continuously variable transmission mechanism.

11. A continuously variable transmission comprising:
a continuously variable transmission mechanism, comprising:
   a primary shaft having a primary pulley;
   a secondary shaft having a secondary pulley; and
   an endless belt wound on the primary pulley and the secondary pulley;
a housing that accommodates the continuously variable transmission mechanism, the housing having an end wall formed with a bearing mounting hole through which one end portion of one of the primary shaft and the secondary shaft penetrates;
a bearing fitted in the bearing mounting hole and allowing the one of the primary shaft and the secondary shaft to be supported rotatably by the end wall;
an urging member provided on an inwardly facing side surface of the bearing and being elastically deformable in an axial direction of the one shaft; and
a cover connected to the housing and covering the one end portion of the one shaft, and engaging the bearing on an outwardly facing side thereof to pinch the bearing axially inwardly against the urging member,
wherein the inwardly facing side surface of the bearing is located closer to the primary or secondary pulley associated with the one shaft than the outwardly facing side surface of the bearing; and
wherein the urging member is a spring.

12. The continuously variable transmission according to claim 11, wherein the cover contacts an outwardly facing side of the end wall, and wherein the bearing protrudes beyond the outwardly facing side of the end wall when the urging member is in a free state.

13. The continuously variable transmission according to claim 11, wherein the cover has an oil passage connected to an internal passage formed in the housing for directing operation fluid to the one shaft.

14. A continuously variable transmission comprising:
a continuously variable transmission mechanism comprising:
   a primary shaft having a primary pulley;
   a secondary shaft having a secondary pulley; and
   an endless belt wound in the primary pulley and the secondary pulley;
a housing that accommodates the continuously variable transmission mechanism, the housing having an end wall formed with a bearing mounting hole through which one end portion of one of the primary shaft and the secondary shaft penetrates;
a bearing fitted in the bearing mounting hole and allowing the one of the primary shaft and the secondary shaft to be supported rotatably by the end wall;
a flange extending radially from an inwardly facing side of the end wall toward the bearing mounting hole;
an urging member provided on an inwardly facing side surface of the bearing and being elastically deformable in an axial direction of the one shaft, the flange supporting the urging member from the inwardly facing side, wherein the urging member is disposed between the flange and the bearing; and
a cover connected to the housing and covering the one end portion of the one shaft, and engaging the bearing on an outwardly facing side thereof to pinch the bearing axially inwardly against the urging member,
wherein the inwardly facing side surface of the bearing is located closer to the primary or secondary pulley associated with the one shaft than the outwardly facing side surface of the bearing.

* * * * *